Figure 1:
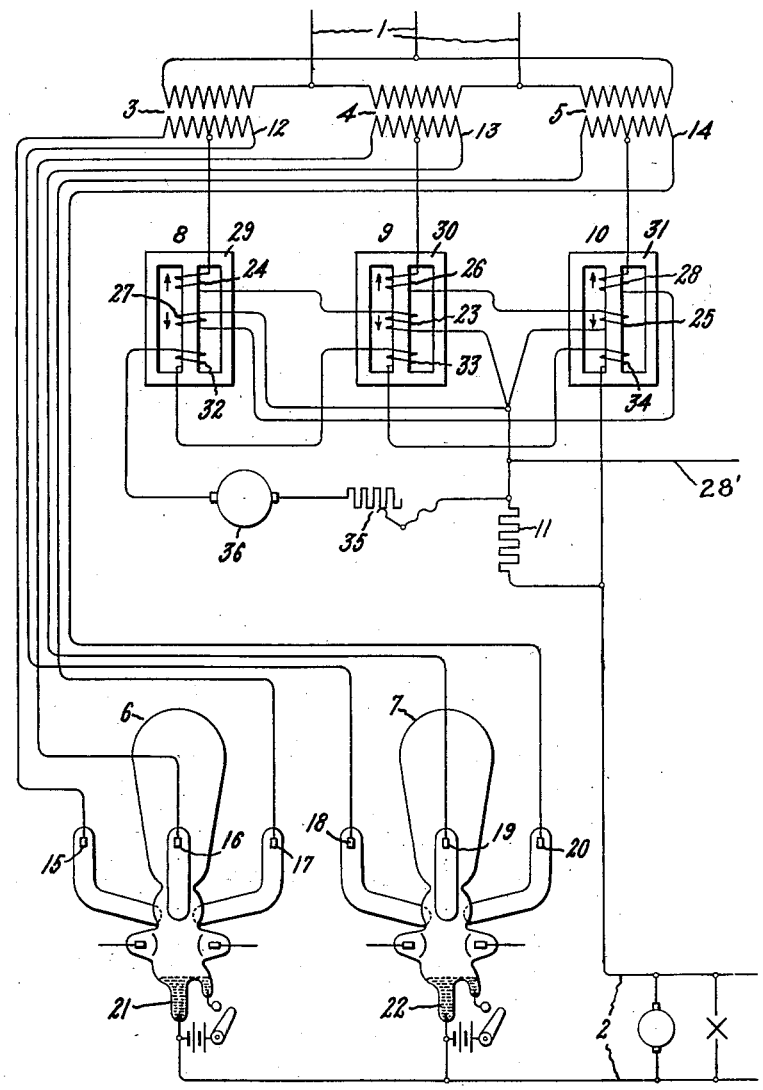

Jan. 10, 1928.

D. C. PRINCE 1,655,475

ELECTRIC SYSTEM

Filed Aug. 12, 1925

4 Sheets-Sheet 1

Inventor:
David C. Prince,
by *Alexander S. [illegible]*
His Attorney.

Jan. 10, 1928.

D. C. PRINCE 1,655,475

ELECTRIC SYSTEM

Filed Aug. 12, 1925     4 Sheets-Sheet 4

Inventor:
David C. Prince,
by *Alexander & [illegible]*
His Attorney.

Patented Jan. 10, 1928.

1,655,475

UNITED STATES PATENT OFFICE.

DAVID C. PRINCE, OF SCHENECTADY, NEW YORK, ASSIGNOR TO GENERAL ELECTRIC COMPANY, A CORPORATION OF NEW YORK.

ELECTRIC SYSTEM.

Application filed August 12, 1925. Serial No. 49,827.

My invention relates to electric systems wherein current transmitted between direct and alternating current circuits is rectified or derectified by an electric valve apparatus comprising a plurality of anodes and wherein the rectified or derectified current is transmitted through an interphase transformer adapted to lengthen the time during which current is transmitted through each anode of the valve apparatus.

It is well known that, in the operation of a rectifying or derectifying apparatus comprising a plurality of anodes, current is successively carried by each of the anodes during a period of time dependent on the number of phases and the frequency of the alternating current delivered or received by the apparatus; that the period of current transmission through each anode of the apparatus may be lengthened by interposing an interphase transformer in the circuit interconnecting the direct and alternating current circuits; and that lengthening the time of current transmission through each anode of the apparatus decreases the average value of the direct current voltage where the apparatus is supplied with current from a constant potential source of alternating current and produces a corresponding change in the relation between the direct and alternating voltages where current is supplied to the apparatus from a direct current source of constant potential.

As pointed out in my copending application for Letters Patent of the United States, Serial Number 739,443, filed September 23, 1924, the effect of the interphase transformer may be nullified by saturating its core and the change in the relation between the alternating and direct current voltages thus produced may be utilized to regulate the voltage of the circuit to which current is supplied. My present invention differs from that disclosed by the aforesaid application both as to the structure and connections of the interphase transformer and as to the manner in which saturation of the transformer core is controlled, and has for its principal object the provision of an improved means for utilizing change in the relation between the voltages of the direct and alternating current circuits to regulate the voltage of the circuit to which current is supplied.

My invention will be better understood from the following description when considered in connection with the accompanying drawings and its scope will be pointed out in the appended claims.

Figure 6:
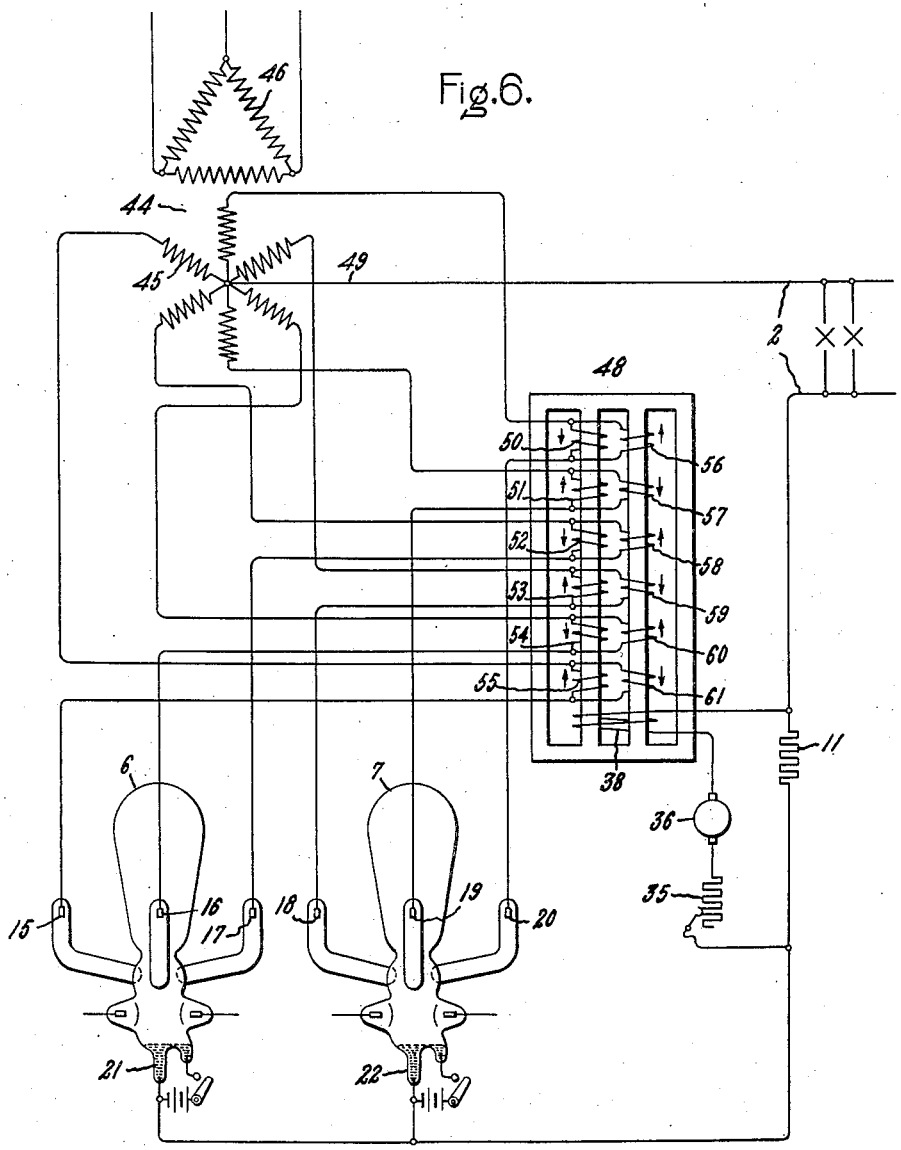
Figure 7:
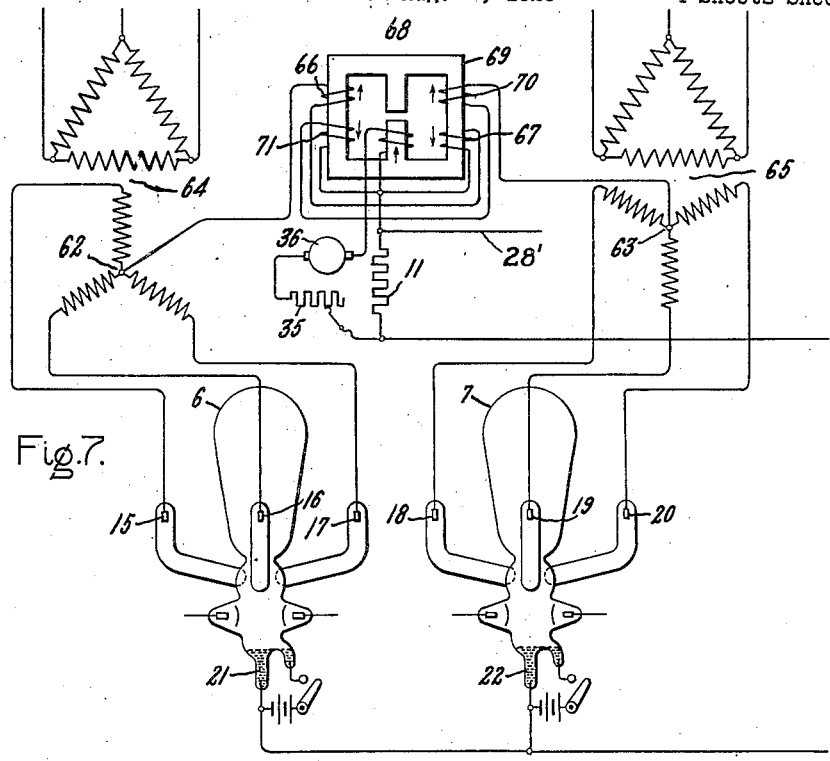
Figure 8:
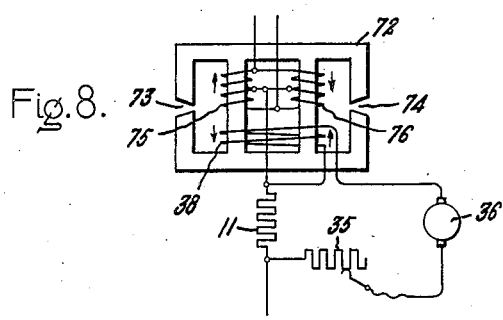
Figure 9:
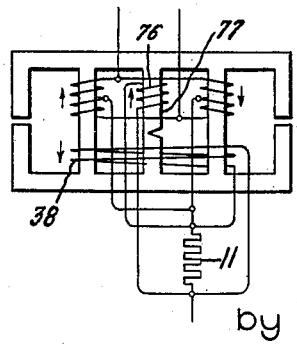

Referring to the drawings, Fig. 1 shows an electric system wherein my invention has been embodied; Figs. 2 to 5 show various modifications in the transformer and the means for controlling the saturation of its core; Figs. 6 and 7 show the manner of applying my invention to systems different from that illustrated by Fig. 1; and Figs. 8 and 9 show modifications of the interphase transformer utilized in connection with the system of Fig. 7.

Fig. 1 shows a polyphase circuit 1 connected to a direct current circuit 2 through main transformers 3, 4 and 5, electric valve apparatus shown as mercury rectifiers 6 and 7, interphase transformers 8, 9 and 10 and a shunt shown as an impedance device 11. It will be observed that the main transformers 8, 9 and 10 comprise secondary windings 12, 13 and 14 respectively; that the left hand terminals of the windings 12, 13 and 14 are connected respectively to the anodes 15, 16 and 17 of rectifier 6; that the right hand terminals of windings 12, 13 and 14 are connected respectively to the anodes 18, 19 and 20 of rectifier 7; that the cathodes 21 and 22 of rectifiers 6 and 7 are connected to one side of the direct current circuit; and that the other side of the direct current circuit is connected to points intermediate the terminals of secondary windings 12, 13 and 14 through shunt device 11 and Y-connected pairs of interphase transformer coils 23 and 24, 25 and 26, and 27 and 28 which are wound on the cores 29, 30 and 31 in a manner to produce neutralization of the fluxes tending to be produced by the direct current component of the rectified current and to add the fluxes produced by the alternating component of the rectified current. An equalizing bus 28' may be connected to the Y-point of the interphase transformer windings where rectifiers are to be operated in parallel with each other, or with other apparatus such as rotary converters for example. Saturation coils 32, 33 and 34 are connected across the shunt resistor 11 in series with a resistor 35 and a source of current 36 provided for transmitting current through the saturation coils in a direction opposite to that in which rectified current is transmitted through these coils.

It will be readily understood that the voltage of the circuit 2 will tend to decrease as the direct current load is increased. The magnitude of the voltage available for preventing this decrease in voltage is dependent on the connections and regulation of the main transformers. Assuming that the main transformer voltage to be unaffected by increase in load and the secondary circuits to be connected in triple single phase as illustrated, a fifty percent rise in voltage is produced by saturating the interphase transformer cores and changing the main transformers from triple single phase to six phase operation. Any decrease in voltage due to regulation of the main transformers of course has the effect of reducing the magnitude of corrective voltage available for regulating the voltage of the circuit 2.

It is desirable that means be provided for suitably regulating the excitation of the saturation coils 32, 33 and 34. Resistors 11 and 35 and current source 36 are provided for this purpose. With current supplied to the saturation coils in opposite directions from the source 36 and the circuit 2, the voltage of the source 36 and the contact position of resistor 35 may be adjusted to produce saturation of the interphase transformer cores at different loads. It is thus possible to regulate the direct current voltage in a manner to produce any desired amount of compounding. It will be apparent that apparatus differing in some respects from that just described may be provided for correlating the changes in direct current load and voltage so as to produce the degree of compounding most suitable for each particular case.

Figure 2:
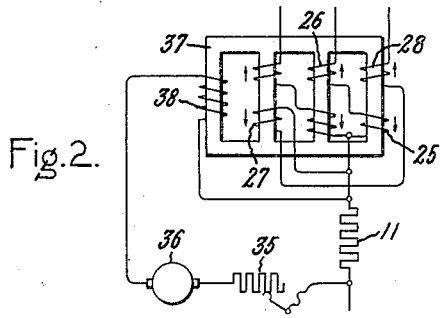

Fig. 2 shows an arrangement wherein the interphase transformer coils 25 to 28 are wound on a single core 37, a single coil 38 wound on a separate leg of the core being provided to control the saturation of the core as previously explained.

Figure 3:
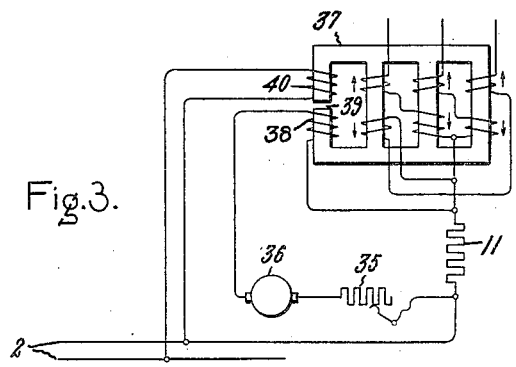

Fig. 3 shows the core 37 as having an air gap 39 in the leg on which the saturation core 38 is wound and is provided with an additional saturating coil 40 arranged to be excited in accordance with the voltage of the circuit 2. This arrangement of the saturation coils has the advantage that it renders available a latitude of adjustment not possible in the arrangement shown by Fig. 2. The air gap produces a more nearly linear relation between the load and the saturation currents, thus changing to some extent the compounding charactertistics of the combination.

Figure 4:
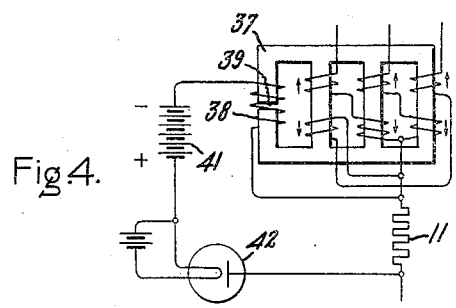

Fig. 4 shows a source of current 41 and an electric valve 42 for predetermining the value of load current at which the transmission of current through the saturation coil 38 in a direction to produce saturation is initiated. With this arrangement, the saturating effect of the load current becomes effective only after the voltage drop across the shunt resistor 11 exceeds the counter electromotive force interposed in the saturation circuit by the battery 41 and valve 42.

Figure 5:
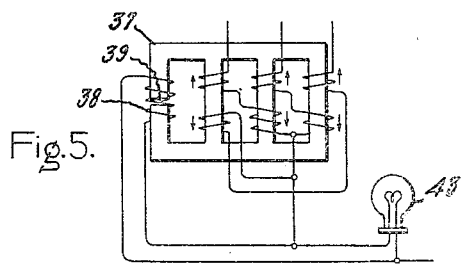

Fig. 5 shows an arrangement wherein a ballast lamp 43 is provided for minimizing the effect of the load current on the excitation of the saturation winding 38 at light load. Due to the fact that the voltage drop of this lamp is low when the current is small and increases rapidly with increase in the current, a much lower proportion of the load current is shunted through the saturation coil 38 at light loads. The particular compounding characteristics produced in this case of course depend on the character of the lamp filament.

Fig. 6 shows a system comprising a main transformer 44 provided with a six phase star-connected secondary windings 45 and a primary winding circuit 46 adapted to be connected to a polyphase source of alternating current. The terminals of the secondary windings 45 are connected to the anodes of rectifiers 6 and 7 through an interphase transformer 48 and the neutral point is connected to one side of the direct current circuit through a conductor 49. The cathodes of the rectifiers 6 and 7 are connected to the other side of the circuit 2 through resistor 11 which is provided for shunting through the saturation coil 38 of the interphase transformer a portion of the load current determined by the voltage of the source 36 and the adjustment of the resistor 35 as previously explained.

It will be observed that the interphase transformer coils 50 and 51 are oppositely wound and are connected to one pair of opposed phases of the secondary windings 45; that the coils 52 and 53 are also oppositely wound and are connected to another pair of opposed phases of secondary windings 45; and that coils 54 and 55 are likewise oppositely wound and connected to still another pair of oppositely wound phases of secondary windings 45. With these connections the effect of the direct current component of the rectified current on the saturation of the interphase transformer coil is cancelled, as indicated by the arrows placed adjacent the coils. Interphase transformer coils 56 to 61 interconnected with and wound oppositely to the coils 50 to 55 respectively are provided for maintaining symmetrical distribution of the saturation flux in the interphase transformer core. Disregarding regulation of the transformer 44, a change of about 15% in the voltage of circuit 2 is produced by saturating the core of the interphase transformer.

In case it is desired to produce a smaller amount of compounding than that produced by changing the main transformers from triple single phase or double three phase to six phase operation, the outside legs of the interphase transformer 48 may be made small enough to ensure that they become saturated before the center legs are completely saturated. Under these conditions, increase in the saturation current produces a lower degree of saturation in the center legs of the interphase transformer and its effect on the voltage relation between the alternating and direct current circuits is correspondingly reduced.

It should be noted that my invention may be utilized to control the distribution of load between a number of interconnected substations. Thus if the regulation of the main transformers is poor, the voltage drop due to their high reactance is neutralized by the compounding effect of the interphase transformers up to full load of the rectifiers. Further increases in load produce a rapid drop in the voltage of the overloaded substation. This characteristic is particularly desirable in railway service for the reason that it is desirable to maintain the voltage at full value up to the full load capacity of the substation after which it is equally desirable to cause a sag in voltage which permits additional load to be carried by adjacent substations.

Fig. 7 shows a system wherein the secondary circuits 62 and 63 of the main transformers 64 and 65 are connected to the direct current circuit 2 for double three phase or double Y operation. In this system, the terminals of winding 62 are connected to the anodes of rectifier 6, the terminals of winding 63 are connected to the anodes of rectifier 7, the neutral point of winding 62 is connected to one side of the direct current circuit 2 through windings 66 and 67 of an interphase transformer 6 provided with a core 69, and the neutral point of winding 63 is connected to the same side of the direct current circuit through interphase transformer coils 70 and 71 and resistor 11. As in the systems previously described, the cathodes of the rectifiers 6 and 7 are connected to one side of the circuit 2 and the saturation coil 38 is connected to the terminals of resistor 11 in series with the direct current source 36 and the adjustable resistor 35. As in the case of the apparatus illustrated by Fig. 1, an equalizing bus may be connected at the Y-point of the interphase transformer coils. It will of course be understood that any of the previously described means for controlling the excitation of the saturation coil may be utilized in the systems of Figs. 6 and 7.

Fig. 8 shows an interphase transformer suitable for use in the system illustrated by Fig. 7. This transformer comprises a core 72 constructed with four legs, the outer legs being formed with air gaps 73 and 74, interphase transformer coils 75 and 76 being wound on the center legs and the saturation coil 38 being wound around both center legs. With this arrangement, the direct current component of the rectified current is cancelled, a symmetrical distribution of the saturation flux in the core is produced, and the compounding characteristics of the combination are so altered that the effect of the load current on the saturation of the interphase transformer gradually decreases as the direct current load increases.

Fig. 9 shows an interphase transformer which differs from that of Fig. 8 in that a magnetic bridge of variable cross section is interposed between the center legs of the core. A winding 76 shown as connected to the resistor 11 in parallel with the saturation winding 38 is wound on the shunt 75. This arrangement operates to delay the saturation effect because the saturation flux is caused to pass through the shunt 75 at light loads and is forced into the main legs of the core at higher loads. By choosing the proper ratio of interphase transformer winding turns, saturation of the main legs may be caused to increase very rapidly at higher values of current.

The embodiment of the invention illustrated and described herein has been selected for the purpose of clearly setting forth the principles involved. It will be apparent, however, that the invention is susceptible of being modified to meet the different conditions encountered in its use. I therefore aim to cover by the appended claims all modifications within the true spirit and scope of my invention.

What I claim as new and desire to secure by Letters Patent of the United States, is:

1. The combination of direct and alternating current circuits, an interphase transformer comprising a core and coils connected between said circuits, means for varying the magnetic saturation of said core, and means comprising a direct current source independent of said direct current circuit for causing said core to become saturated at different predetermined values of the current transmitted between said circuits.

2. The combination of direct and alternating current circuits, means comprising a core and coils connected between said circuits, means operable in response to the current transmitted between said circuits for varying the saturation of said core, and means for minimizing the effect of said current on the saturation of said core throughout a predetermined range of variation in the value of said current.

3. The combination of direct and alternating current circuits, means comprising a core and coils connected between said circuits, a coil connected to be energized in response to the transmission of current between said circuits and wound on said core for controlling the saturation thereof, and means comprising a direct current source independent of said direct current circuit for predetermining the value of said current at which saturation of said core is produced.

4. The combination of direct and alternating current circuits, means comprising a core and coils connected between circuits, a coil connected to be excited in response to the transmission of current between said circuits and wound on said core for controlling the saturation thereof, and means connected to said coil for neutralizing the effect of said excitation until the value of said current has attained a predetermined value.

5. The combination of direct and alternating current circuits, means comprising a core and coils connected between said circuits, a coil connected to be excited in response to the transmission of current between said circuits and wound on said core for controlling the saturation thereof, and means comprising a direct current source independent of said direct current circuit for predetermining the value of said current at which the excitation of said coil is initiated.

6. The method of regulating the voltage of a direct current circuit connected to an alternating current circuit through interphase transformer windings wound on a single core which comprises neutralizing the effect of the current transmitted between said circuits on the saturation of said core throughout one range of operation and varying the saturation of said core in accordance with change in the value of said current throughout another range of operation, whereby saturation of said core is produced at a predetermined value of said current.

7. The combination of direct and alternating current circuits, a magnetic core, a plurality of coils wound on said core and connected between said circuits, an impedance device connected in said direct current circuit, a source of current independent of said direct current circuit, and a saturation coil wound on said core and connected to said source through said impedance means.

8. The combination of direct and alternating current circuits, a magnetic core, a plurality of coils wound on said core and connected between said circuits, an impedance device connected in said direct current circuit, a source of current independent of said direct current circuit, a saturation coil wound on said core and connected to said source through said impedance means, and means for adjusting the resultant voltage applied to said saturation coil through said source and said impedance device.

9. The combination of direct and alternating current circuits, a magnetic core, a plurality of coils wound on said core and connected between said circuits, an impedance device connected in said direct current circuit, a source arranged to produce a voltage which is opposed to that of said impedance device, and a saturation coil wound on said core and connected to said source through said impedance device.

In witness whereof, I have hereunto set my hand this 11th day of August, 1925.

DAVID C. PRINCE.